MAGNETIC CORE FLIP-FLOP CIRCUIT
Filed June 12, 1958 2 Sheets-Sheet 1
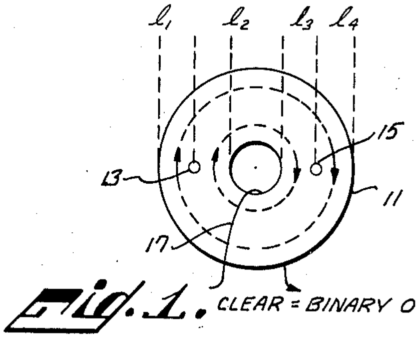
FIG. 1. CLEAR = BINARY 0
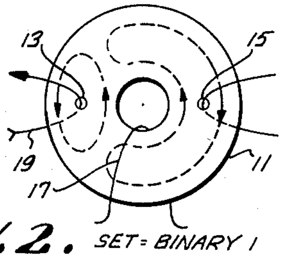
FIG. 2. SET = BINARY 1
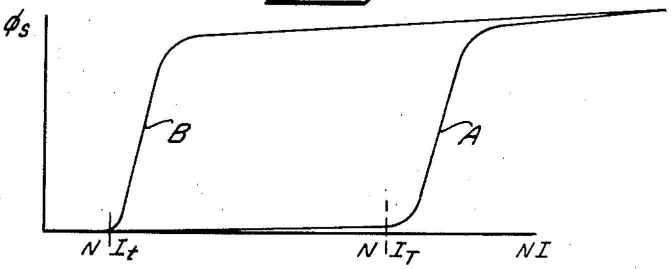
FIG. 3.
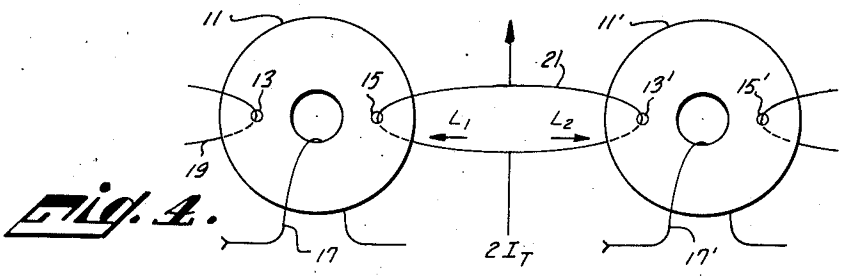
FIG. 4.
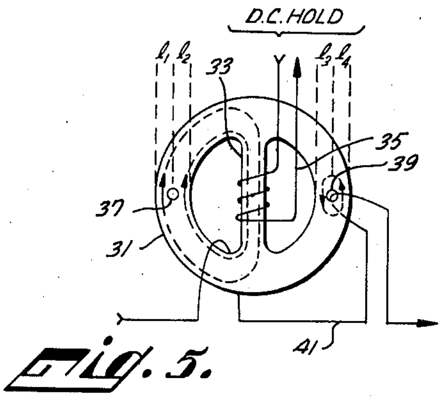
FIG. 5.
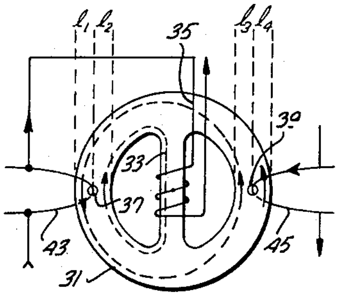
FIG. 6.
INVENTOR.
HEWITT D. CRANE
BY
Christie, Parker & Hale
ATTORNEYS INVENTOR.
HEWITT D. CRANE
BY
Christie, Parker & Hale
ATTORNEYS

United States Patent Office 2,968,030
Patented Jan. 10, 1961

2,968,030

MAGNETIC CORE FLIP-FLOP CIRCUIT

Hewitt D. Crane, Palo Alto, Calif., assignor to Burroughs Corporation, Detroit, Mich., a corporation of Michigan Filed June 12, 1958, Ser. No. 741,694

7 Claims. (Cl. 340—174)

This invention relates to ferrite magnetic core circuits for performing binary logic functions, and more particularly is concerned with a bistable flip-flop circuit employing magnetic core elements.

In copending application Serial No. 703,003, filed December 16, 1957 in the name of Hewitt D. Crane and assigned to the assignee of the present invention, there is described a magnetic core circuit using a specially shaped ferrite core element for providing a negation function. Thus when a binary zero is stored in the input in the form of flux extending in the same direction on either side of the input aperture, a binary one is stored at the output in the form of flux extending in opposite directions on either side of the output aperture. Transmission of a binary one to the input reverses these two flux conditions at the input and output apertures of the core element.

The present invention utilizes the principles of the above-identified copending application to provide a binary flip-flop type of circuit. The circuit has two stable states and can be set to either one of these states by activating one or the other of two inputs. This is accomplished by means of a pair of negating core elements of the type mentioned above, with the inputs and outputs being respectively coupled together in a closed loop. In one stable state, binary ones are always transferred by one of the loops and binary zeros are always transferred by the other loop. A change to the other stable state reverses this condition. The flip-flop circuit can be set and reset by input signals applied to the respective negating core elements.

For a better understanding of the invention, reference should be had to the accompanying drawings, wherein:

Figs. 1 and 2 show a ferrite magnetic core element of known configuration in two conditions of flux orientation;

Fig. 3 is a set of curves illustrating the magnetizing properties of the core element shown in Figs. 1 and 2;

Fig. 4 is a schematic showing of a transfer circuit including two core elements of the type shown in Figs. 1 and 2;

Figs. 5 and 6 show a negating ferrite magnetic core element configuration according to the teaching of the present invention and illustrating two conditions of flux orientation;

Figure 7:
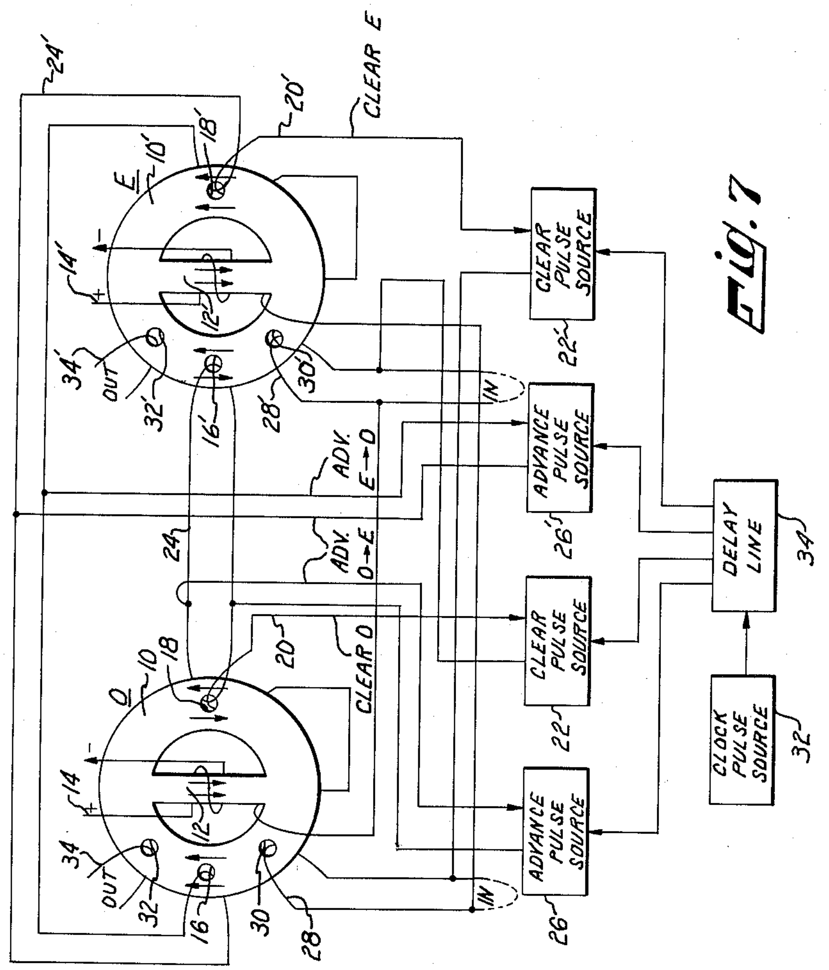
Fig. 7 is a schematic block diagram of the flip-flop circuit of the present invention.

Consider an annular core, such as indicated at 11 in Fig. 1, made of a magnetic material, such as ferrite, having a "square" hysteresis loop, i.e., a material having a high flux retentivity or remanence. The annular core is provided with two apertures 13 and 15. Each of the apertures in effect divides the core into legs or parallel flux paths, the aperture 13 forming two legs $l_1$ and $l_2$, and the aperture 15 forming two legs $l_3$ and $l_4$. If a large current is passed through the central opening of the core 11, as by a clearing winding 17, the flux in the core may be saturated in a clockwise direction, as indicated by the arrows, and the core is said to be in the cleared or binary zero state. If a current is passed through one of the apertures 13 or 15, as by passing a current through a winding 19 passing through the aperture 13, in the manner described in detail in the above-mentioned co-pending application, the flux in the legs $l_1$ and $l_3$ is reversed, as indicated by the arrows in Fig. 2. The resulting flux pattern in the core is shown by the dotted lines, and the core is said to be in the set or binary one state.

If the core 11 is initially in its cleared condition, applying a current through the winding 19 having N turns linking the aperture 13 of the core 11 switches flux according to the relation set forth by curve A in Fig. 3. Thus, as the current is increased up to a threshold level where $NI=NI_T$, substantially no flux is switched in the core. When the current exceeds the threshold level, the flux rapidly begins to switch with further increase of current until a saturation level is reached in which all of the flux is switched in the opposite direction. As mentioned above, this results in the flux pattern of Fig. 2 in which the core is in its set or binary one condition.

If a current is now passed through the winding 19 in the opposite direction, the resulting flux change as a function of current is represented by curve B of Fig. 3. In this case, the current may increase to a threshold level where $NI=NI_t$ without appreciable switching of flux. With further increase in current, the flux begins to switch until a saturation level is reached in which all of the flux is switched that can be switched. What is happening in the latter case is that current passing through the winding 19 switches flux locally around the aperture 13 but does not switch any flux around the aperture 15.

As further described in the above-identified co-pending application, the flux state of one core can be transferred to another core in the following manner. Consider the circuit of Fig. 4 including a transmitting core 11 and a receiving core 11'. A coupling loop 21 links the core 11 through the aperture 15 to the core 11' through the aperture 13'. Assume a current applied across the transfer loop 21 sufficient to bring both cores to their thresholds $NI_T$. It will be seen that the current splits between the winding linking the aperture 15 of the transmitting core and the aperture 13' of the receiving core. If both cores are in their cleared condition and the resistances are arranged so that the ampere turns linking the two cores are substantially equal, no flux will be switched in either the transmitting or the receiving core. However, if the transmitting core 11 has been previously set with its flux in the binary one condition, a current passing through the aperture 15 can switch flux locally in the core 11, since the threshold level for switching flux locally about an aperture when the core is in the set condition is much lower, as shown by curve B in Fig. 3. The switching of flux about the aperture 15 in the transmitting core 11 induces a voltage in the coupling loop which, by Lenz's law, opposes the flow of current in the branch of the coupling loop linking the aperture 15 of the transmitting core. As a result, the current passing through the branch of the transfer loop 21 which links the aperture 13' of the receiving core 11' increases. The increased current is sufficient to switch flux in the receiving core 11', thereby setting the receiver to the binary one condition. Thus, it will be seen that the application of a transfer pulse of predetermined magnitude across the transfer loop 21 leaves the receiving core 11' in the binary zero state or changes it to the binary one state, depending upon the existing condition of the transmitting core 11.

With this brief review of the operation of the core circuit for accomplishing straight transfer, consider the requirements of the core device to provide a negating type of transfer. When the input aperture 13 is in its cleared condition, as shown in Fig. 1, the output aperture 15 should be in its set condition, as shown in Fig. 2, if it is to operate as a negating device. A transfer of a zero to the core should not change this condition, but a transfer via the transfer winding 19 of a binary one should leave the core negating device with the flux condition of the input aperture being in the set condition as shown in Fig. 2, and the output aperture 15 being in the blocked (binary zero) condition as shown in Fig. 1.

This is accomplished by the present invention by providing a core element as shown in Figs. 5 and 6. Here the core element 31 is provided with a central shunting portion 33 on which is wound a hold winding 35. Input and output aperture 37 and 39 are provided in the core on either side of the shunt 33. A clearing winding 41 is preferably provided which is wound on the core 31 adjacent the input aperture 37 and links the core through the output aperture 39. Thus, when a current pulse is sent through the clearing winding 41 in the direction indicated by the arrow, it saturates the flux in the legs $l_1$ and $l_2$ on either side of the input aperture 37 in the same direction. A closed flux path extends through the shunting portion 33 for the flux in the legs $l_1$ and $l_2$. At the same time, the ampere-turns linking the output aperture 39 set the flux locally in a closed path around the aperture 39 so that the flux extends in opposite directions in the legs $l_3$ and $l_4$. The initial condition described above for a negating device is not provided, namely, the portion of the core around the input aperture 37 is in the settable condition while the output aperture 39 is in the unblocked (binary one) condition.

Assume that a large current pulse is now passed through the input aperture 37, as by means of an input winding 43 linking the leg $l_1$ of the core 31 through the input aperture 37. The direction of current is such as to reverse the direction of flux in the leg $l_1$. The closed path of the reversed flux cannot extend through the leg $l_2$, since that leg is already saturated and can accept no additional flux in the same direction. By applying a D.C. holding current through the winding 35 on the shunting portion 33, flux is prevented from reversing in the shunting portion 33. Consequently, the only place where the flux can reverse in response to the current pulse on the input winding 43 is in the leg $l_3$. Thus, as a result of the pulse on the input winding the second condition of the negating device as described above is now provided, namely, the core in the region of the input aperture 37 has the flux in the set or binary one condition while the core in the region of the output aperture 39 has flux in the blocked (binary zero) condition. While the direction of the arrows representing the flux about the output aperture 39 in Figs. 5 and 6 is reversed from the direction of the arrows representing the flux about the output aperture 15 in Figs. 1 and 2, this is of no consequence as to the overall operation and may be compensated for by reversing the direction in which current is passed through the output winding linking the output aperture 39 during transmission.

As shown in Fig. 7 of the drawing, the flip-flop circuit consists of two negating core elements 10 and 10′ which are of the form described in detail in the above-mentioned copending application Serial No. 703,003. The core elements are substantially annular in shape with center legs 12 and 12′ respectively extending diametrically across the central portion of the annular core elements. D.C. energized holding windings 14 and 14′ are respectively wound on the central legs to maintain the flux saturated in a downward direction.

Each of the negating core elements are provided with input and output apertures respectively located on either side of the central leg, the input apertures being indicated at 16 and 16′ respectively, and the output apertures being indicated at 18 and 18′ respectively. Each of the apertures divides the core into an inner leg and an outer leg in which the direction of flux is controlled.

Each of the core elements 10 and 10′ is provided with a clearing winding, indicated at 20 and 20′. A portion of the clearing winding links the core element through the central opening to the left of the center leg and a second portion of the winding links the output aperture of the negating core elements. The clearing windings are energized from clearing pulse sources 22 and 22′ which, when pulsed, provide unidirectional current flow through the associated clearing windings in the direction indicated.

The clearing windings when energized saturate the flux in the two legs on either side of the input apertures 16 and 16′ respectively in an upward direction as shown by the arrows on either side of the input apertures 16 of the core element 10. At the same time, the clearing windings, when energized, set the flux in a counterclockwise direction in a small path around the output apertures 18 and 18′, providing flux extending in opposite directions in the two legs on either side of the output apertures, as indicated by the arrows on either side of the output aperture 18 of the core element 10.

By definition, flux extending in the same direction on either side of an aperture in a core element is designated as a binary zero flux condition, while flux extending in opposite directions on either side of an aperture is designated as a binary one flux condition. Thus the core element 10 as shown in the figure has a binary zero flux condition existing at the input aperture 16 and a binary one flux condition existing at the output aperture 18 in response to a pulse applied to a clearing winding 20.

A coupling loop 24 links the output aperture 18 of the negating core element 10 to the input aperture 16′ of the negating core element 10′. The coupling loop has windings linking the outer legs formed by the respective apertures in the negating core elements. Similarly a coupling loop 24′ links the output aperture 18′ of the negating core element 10′ to the input aperture 16 of the negating core element 10. A current is applied to the respective transfer loops 24 and 24′ in the direction indicated from transfer pulse sources 26 and 26′ respectively. When pulsed, the sources 26 and 26′ provide unidirectional current of predetermined constant level to the transfer loops, the current dividing between the two windings in each of the loops.

In accordance with the principles set forth in the above-identified copending application Serial No. 703,003, a pulse is applied to the transfer loop 24. If a binary one flux condition exists at the output aperture 18, the transfer pulse establishes a binary one flux condition at the input aperture 16′. However, if the output aperture 18 is in the binary zero flux condition, application of the transfer pulse leaves the input aperture 16′ in the zero flux condition. The same applies to the application of a pulse to the transfer loop 24′ from the transfer pulse source 26′.

Each of the negating core elements 10 and 10′ of the circuit in the figure is provided with an input winding, as indicated at 28 and 28′ respectively, linking auxiliary input apertures 30 and 30′ respectively, the auxiliary input apertures being located adjacent the apertures 16 and 16′.

Since the circuit as described is pulse operated, a clock pulse source 32 is provided. The source is coupled to means, such as delay line 34, for generating a cycle of four successive clock pulses on as many outputs. The four outputs from the delay line are coupled to the advance pulse source 26, clear pulse source 22, advance pulse source 26′, and clear pulse source 22′ to pulse these sources in the order listed.

Assume that with the negating core element 10′ cleared in response to a pulse through the clear winding 20′, a current pulse in the direction indicated by the arrow is passed through the input winding 28′. This reverses flux in the inner leg formed by the input aperture 16′ and in the inner leg formed by the output aperture 18′. Thus the output aperture 18′ is in the binary zero condition.

If now the clear winding on the negating core element 10 is energized, establishing the flux condition shown in the figure, with the input aperture 16 in the binary zero flux state and the output aperture 18 in the binary one flux state, pulsing the transfer loop 24' in response to the source 26' produces no flux change in the negating core element 10. The reason is that the transfer pulse applied to the coupling loop 24' does not reverse any flux in the output aperture 18' and therefore produces no change of flux in the input aperture 16.

If then the negating core element 10' is cleared by pulsing the clearing pulse source 22' and then a transfer pulse is applied to the loop 24 by pulsing the source 26', the negating core element 10' will be back in the flux condition indicated by the arrows associated with the negating core element 10' in the figure.

It will be apparent from the above description that once an input is applied to the winding 28', each complete cycle of four pulses from the delay line 34 leaves the cores in the same flux condition. The transfer loop 24 always in effect transfers flux from the negating core element 10 to the negating core element 10', i.e., the transfer loop 24 produces a switching of flux at the input aperture 16'. On the other hand the transfer loop 24' never causes a transfer of flux, i.e., never produces any change of flux in the negating core element 10.

However, if an input is applied to the winding 28 by means of the current pulse in the direction shown by the arrows in the figure, the condition described above is reversed. Now a binary zero condition is effected at the output aperture 18. Thus when the negating core element 10' is cleared, pulsing of the transfer loop 24 will not result in any transfer of flux from the negating core element 10 to the negating core element 10'. As a result, the input aperture 16' stays in the binary zero condition and the output aperture 18' remains in the binary one flux condition. The subsequent pulsing of the transfer loop 24' now effects a transfer of flux, changing the input aperture 16 to the binary one flux condition and changing the output aperture 18 to the binary zero flux condition.

From the description of the circuit thus far, it will be apparent that there are two stable operating conditions of the circuit, namely, the one stable condition in which the loop 24 operates at a high flux switching level and the loop 24' operates at a low flux switching level, and the other stable condition in which the loop 24 operates at a low flux switching level and the loop 24' operates at a high flux switching level. Which of these two stable operating conditions exists depends upon whether an input is applied to one or the other of the two inputs. Thus the operation of the circuit is in all respects equivalent to a conventional bistable flip-flop circuit which has two stable operating conditions, depending on which of two inputs is actuated.

Utilizing the principles set forth in copending application Serial No. 741,687, filed June 12, 1958 in the name of David R. Bennion et al., and assigned to the assignee of the present invention, the auxiliary input windings 28 and 28' may be operated during clear time for the negating core elements 10 and 10'. The two input windings 28 and 28' may be part of transfer loops from other core elements (not shown). The loop including the input winding 28 is connected in series with the clear winding 20' to the clearing pulse source 22'. Thus an input can be set to the flip-flop through the negating core element 10 at the same time the negating core element 10' is being cleared. Similarly the loop including the input winding 28' may be connected in series with the clear winding 20 through the clearing pulse source 22, whereby the negating core element 10' can be set at the time the negating core element 10 is being cleared. This has the advantage that no sub-clock pulses are required to read in information to the auxiliary inputs, as would otherwise be required since they cannot normally be operated simultaneously with the operation of the transfer loops 24 and 24'.

The condition of the flip-flop circuit can be sensed in various ways. For example, auxiliary output apertures 32 and 32' may be provided which are linked by output windings 34 and 34'. These windings may be part of transfer loops coupled to other output core elements (not shown) or other suitable circuits for indicating the flux codition at the respective output apertures.

What is claimed is:

1. A magnetic core bistable flip-flop circuit comprising a pair of negating core elements of magnetic material having high flux remanence, each core element defining three separate flux-carrying legs, two of the legs each having at least one aperture therethrough dividing the associated legs into two parallel flux paths in the region of the respective apertures, means responsive to a current pulse for saturating the flux in one of the negating core elements in a closed loop including two of the legs only one of which has an aperture and saturating the flux in a closed path around the aperture within the remaining leg, means responsive to a current pulse for saturating the flux in the other of the negating core elements in a closed loop including two of the legs only one of which has an aperture and saturating the flux in a closed path around the aperture within the remaining leg, a first transfer loop including two windings connected in shunt respectively linking one of said apertures in the first negating core element and linking one of said apertures in the second negating core element, a second transfer loop including two windings connected in shunt respectively linking the other of said apertures in the first core element and linking the other of said apertures in the second core element, and means for cyclically pulsing a current through said means for saturating flux in the first core element, the first transfer loop, said means for saturating flux in the second core element, and the second transfer loop, the average current level in the two windings of each of the transfer loops being below the threshold level required to switch flux in a core when the flux is oriented in the same direction in the two parallel paths formed by the aperture through which the switching current passes.

2. Apparatus as defined in claim 1 wherein each of the negating core elements has an additional aperture in one of the legs having apertures, and input windings respectively linking the additional apertures in the two negating core elements.

3. A bistable magnetic core circuit comprising a pair of negating core elements of magnetic material having high flux remanence, each of the negating cores having an outer portion defining a relatively long closed loop flux path and a shunting portion extending between opposite regions of the outer portion, each core element having input and output apertures extending through the outer portion and located on opposite sides remote from the shunting portion, clearing windings respectively wound on the outer portions of each of the core elements and including turns linking the output apertures, a first closed conductive loop including windings linking the output aperture of a first one of the core elements and the input aperture of a second one of the core elements, a second closed conductive loop including windings linking the output aperture of the second one of the core elements and the input aperture of the first one of the core elements, and means for successively pulsing a current through the clearing winding linking the first core element, the loop coupling the output of the second core element to the input of the first core element, the clearing winding linking the second core element, and the loop coupling the output of the first core element to the input of the second core element.

4. Apparatus as defined in claim 3 including means for switching flux around the relatively long closed flux path formed by the outer portion of the first core element in response to a first input signal, and means for switching flux around the relatively long closed flux path formed by the outer portion of the second core element in response to a second input signal.

5. Apparatus as defined in claim 4 wherein the means for switching flux in the first core element is pulsed simultaneously with the clearing winding linking the second core element, and the means for switching flux in the second core element is pulsed simultaneously with the clearing winding linking the first core element.

6. Apparatus as defined in claim 4 including first output means associated with the first core element for sensing the flux condition in the core element and second output means associated with the second core element for sensing the flux condition in the second core element.

7. A bistable magnetic circuit comprising first and second core devices made of magnetic material having a substantially rectangular hysteresis loop characteristic, each core device having a portion providing a relatively long flux path and having small input and output apertures at spaced positions along said long flux path, first means including a winding linking said portion of the first core device intermediate the input and output apertures for setting all the flux in the same direction in the long flux path in the region of the input aperture and further including a winding linking the output aperture for setting the flux in one direction in a small flux path around the output aperture, second means including a winding linking said portion of the second core device intermediate the input and output apertures for setting all the flux in the same direction in the long flux path in the region of the input aperture and further including a winding linking the output aperture for setting the flux in one direction in a small flux path around the output aperture, a pair of transfer circuits, each circuit including a pair of windings connected in parallel respectively linking the input aperture of one core device and the output aperture of the other core device, whereby the two cored devices are connected in a closed loop by the transfer circuits, means for pulsing a transfer current through the parallel windings of one of the transfer circuits, and means for pulsing a transfer current through the parallel windings of the other transfer circuit.

References Cited in the file of this patent

UNITED STATES PATENTS

| | | |
|---|---|---|
| 2,802,953 | Arsenault | Aug. 13, 1957 |
| 2,868,451 | Bauer | Jan. 13, 1959 |